(No Model.)
H. WARDEN.
SAFETY CHECK VALVE FOR HYDRAULIC MACHINERY.
No. 425,276. Patented Apr. 8, 1890.
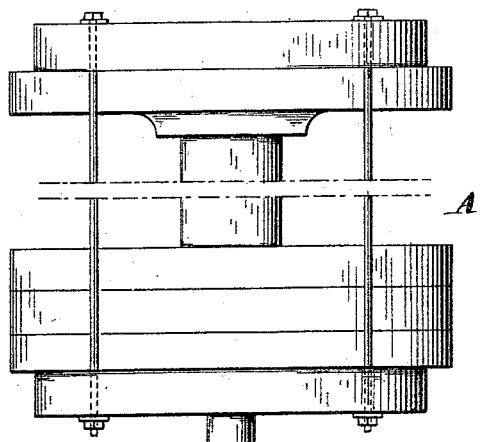
FIG. 1.
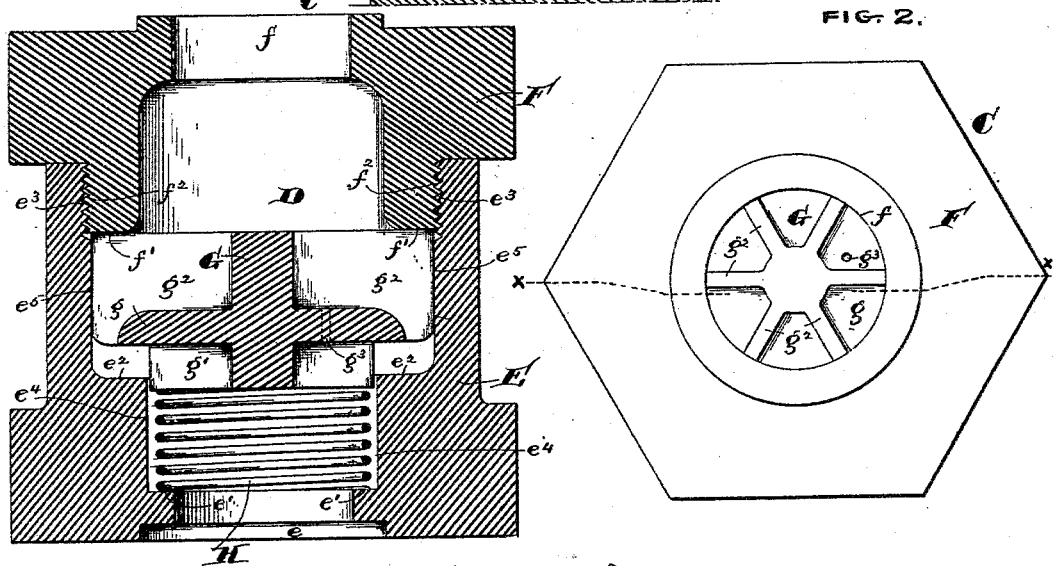
FIG. 3.
FIG. 2.
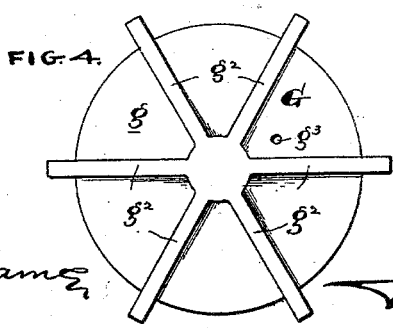
FIG. 4.
WITNESSES:
Henry Drury
David S. Williams
INVENTOR:
Henry Warden
by his attorney
Francis T. Chambers

UNITED STATES PATENT OFFICE.

HENRY WARDEN, OF PHILADELPHIA, PENNSYLVANIA.

SAFETY CHECK-VALVE FOR HYDRAULIC MACHINERY.

SPECIFICATION forming part of Letters Patent No. 425,276, dated April 8, 1890.

Application filed December 2, 1889. Serial No. 332,289. (No model.)

*To all whom it may concern:*

Be it known that I, HENRY WARDEN, of the city and county of Philadelphia, State of Pennsylvania, have invented a new and useful Safety Check-Valve for Hydraulic Machinery, of which the following is a true and exact description, reference being had to the accompanying drawings, which form a part of this specification.

The object of my invention is to provide a check-valve for hydraulic accumulators, jib-cranes, hoists, lifts, &c., which will prevent the rapid fall of the load in case of the bursting of the pipe or other accident which would relieve the normal working pressure.

The nature of my new device for accomplishing this object will be best understood after a description of the drawings, in which it is illustrated, and in which—

Figure 1 represents my valve attached to an accumulator. Fig. 2 is a plan view of the valve-case; Fig. 3, a cross-section thereof on line $x$ $x$ of Fig. 2, and Fig. 4 a plan view of the valve.

A represents a hydraulic accumulator of ordinary type, B its water-supply pipe, and C my improved check-valve secured in said supply-pipe close to its entrance into the accumulator proper.

D is the valve-chamber formed in a casing consisting of the parts E and F threaded, as shown at $e^3$ and $f^2$, so as to screw together. The part E of the casing has an opening $e$ by which the water enters chamber D from the supply-pipe, and it is chambered so as to afford the annular seat $e'$ for the spring H and the annular valve-seat $e^2$. The part F has the opening $f$, through which the water flows to the accumulator, and has the shoulder $f'$ formed upon it to restrict the motion of the valve.

G is the valve consisting of a disk $g$, adapted to seat itself on the seat $e^2$ and close the passage between chamber D and the entrance opening $e$. Guide-wings $g^2$ are formed on the valve, which, fitting along the wall $e^5$ of the chamber D, serve to prevent the valve G from tipping, and by coming in contact with shoulder $f'$ limit the distance it can move upward from its seat. Similar guide-wings $g'$ are provided on the under side of the valve, which, by fitting in the cylindrical opening $c^4$, coact with the wings $g^2$ in centering and regulating the motion of the valve.

H is a spring resting against the flange or rim $e'$ and against the under side of valve G, its action being to hold the valve open, as shown in Fig. 3.

$g^3$ is a perforation through valve G.

My valve-casing is secured in the supply-pipe, so that the water entering the accumulator or other hydraulic machinery passes from opening $e$ through chamber D and opening $f$ to the accumulator, the return or exit flow being in the opposite direction. The valve G, opening in the direction of the inward flow and being, besides, normally held open by the spring H, offers no resistance to said inward flow, and the opening between the valve and its seat bears such a relation to the power of spring H that the exit flow of water will, under normal working conditions, not exert power enough to close the valve; but in case its pressure is increased over the normal working pressure the spring will permit the valve to close, thus checking the exit flow and preventing the fall of the load in case of a bursting pipe or other accident. I prefer to form in valve G a perforation $g^3$, of such area that when the valve is closed the water in the accumulator will escape slowly through it, so as to allow the accumulator to fall at a safe working speed, this being in the nature of a safety device, and only coming into operation should a valve be opened too wide or an accident happen.

It will be understood that the particular construction of the valve-chamber and valve shown in the drawings is not an essential feature of my invention, and I do not wish to be understood as limiting my claims to any particular features of construction not specifically referred to in the claims.

Having now described my invention, what I claim as new, and desire to secure by Letters Patent, is—

1. In combination with a hydraulic accumulator or its equivalent, as described, a water-supply pipe leading thereto, a valve arranged in said supply-pipe so as to close in the direction of the escape of water, and a spring arranged to hold the valve open against the pressure of the normal escape flow, but permit it to close when the pressure of the escape exceeds that amount.

2. In combination with a hydraulic accumulator or its equivalent, as described, a water-supply pipe leading thereto, a valve arranged in said supply-pipe so as to close in the direction of the escape of water, and having a small opening $g^3$ formed therein, and a spring arranged to hold the valve open against the pressure of the normal escape flow, but permit it to close when the pressure of the escape exceeds that amount.

HENRY WARDEN.

Witnesses:
 H. W. HARE POWEL,
 LEWIS R. DICK.